(12) United States Patent
Takahashi et al.

(10) Patent No.: US 8,507,150 B2
(45) Date of Patent: Aug. 13, 2013

(54) FUEL CELL MODULE

(75) Inventors: Tsutomu Takahashi, Wako (JP);
Yukihiko Kiyohiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 13/264,323

(22) PCT Filed: Apr. 9, 2010

(86) PCT No.: PCT/JP2010/056439
§ 371 (c)(1),
(2), (4) Date: Oct. 13, 2011

(87) PCT Pub. No.: WO2010/119817
PCT Pub. Date: Oct. 21, 2010

(65) Prior Publication Data
US 2012/0045702 A1 Feb. 23, 2012

(30) Foreign Application Priority Data
Apr. 13, 2009 (JP) ................................ 2009-097150

(51) Int. Cl.
*H01M 8/04* (2006.01)
*H01M 8/24* (2006.01)

(52) U.S. Cl.
USPC ........... 429/514; 429/513; 429/512; 429/457; 429/456; 429/455

(58) Field of Classification Search
USPC ................... 429/514, 513, 512, 457, 456, 455
See application file for complete search history.

(56) References Cited

U.S. PATENT DOCUMENTS

| | | | |
|---|---|---|---|
| 2005/0136319 A1* | 6/2005 | Tsunoda et al. | 429/39 |
| 2006/0134499 A1 | 6/2006 | Homma | |
| 2008/0008917 A1 | 1/2008 | Homma | |

FOREIGN PATENT DOCUMENTS

| | | |
|---|---|---|
| JP | 8-45535 | 2/1996 |
| JP | 8-88018 | 4/1996 |
| JP | 2005-142042 | 6/2005 |
| JP | 2006-179283 | 7/2006 |
| JP | 2006-179289 | 7/2006 |
| JP | 2006-179402 | 7/2006 |
| JP | 2007-73359 | 3/2007 |
| WO | WO2007142046 | * 12/2007 |

OTHER PUBLICATIONS

International Search Report for Application No. PCT/JP2010/056439, dated Jul. 27, 2010.
Supplementary European Search Report for Application No. 10764401.5, 8 pages, dated May 21, 2013.

* cited by examiner

*Primary Examiner* — Helen O Conley
(74) *Attorney, Agent, or Firm* — Nelson Mullins Riley & Scarborough LLP; Anthony A. Laurentano (57) ABSTRACT

Disclosed is a fuel cell module provided with a fuel cell stack and a load-applying mechanism. The load-applying mechanism is provided with: a first clamping part that applies a first camping load, in the direction of stacking, to the gas seal part of the fuel cell stack; a second clamping part that applies to an electrolyte/electrode unit, in the aforementioned direction of stacking, a second clamping load that is lighter than the first clamping load; and a third clamping part that is provided on the first clamping part and, separately from the first clamping part, applies a third clamping load to the gas seal part in the aforementioned direction of stacking.

6 Claims, 12 Drawing Sheets

United States Patent US 8,507,150 B2

FUEL CELL MODULE

RELATED APPLICATIONS

This application is a 35 U.S.C. 371 national stage filing of International Application No. PCT/JP2010/056439, filed Apr. 9, 2010, which claims priority to Japanese Patent Application No. 2009-097150 filed on Apr. 13, 2009 in Japan. The contents of the aforementioned applications are hereby incorporated by reference.

TECHNICAL FIELD

The present invention relates to a fuel cell module including a fuel cell stack formed by stacking a plurality of fuel cells and a load applying mechanism for applying the load to the fuel cell stack in the stacking direction. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive oxide such as stabilized zirconia. The electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

In the fuel cell stack, it is required to apply a stacking load for tightening the fuel cells in the stacking direction. In order to maintain the desired sealing performance, the required stacking load is high in portions where reactant gases (in particular, the fuel gas) flow in the fuel cell stack. Further, in order to prevent the MEAs from being damaged undesirably, a relatively small load needs to be applied to portions where the MEAs of the fuel cell stack are supported. For this reason, the load applying mechanism for applying the stacking load to the fuel cell stack is required to apply different loads to the portions where gas sealing is performed and the portions where the MEAs are supported.

Figure 10:
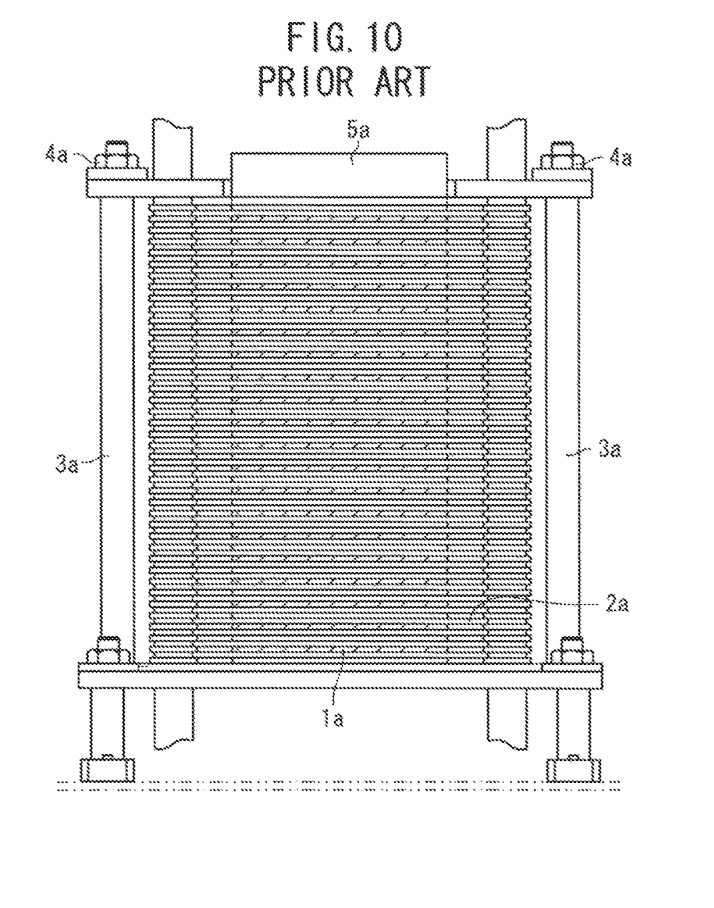
FIG. 10 is a view showing a fuel cell disclosed in Japanese Laid-Open Patent Publication No. 2007-073359.

In this regard, for example, in a fuel cell disclosed in Japanese Laid-Open Patent Publication No. 2007-073359, as shown in FIG. 10, in a fuel cell formed by stacking power generation cells $1a$ and separators $2a$, a tightening load is applied to the fuel cell using tie-rods $3a$ and nuts $4a$ to maintain the desired gas sealing performance. A weight $5a$ is disposed on the power generation cells $1a$, above the center of the separators $2a$. Power generation elements of the power generation cells $1a$ tightly contact each other by the load applied by the weight $5a$.

Figure 11:
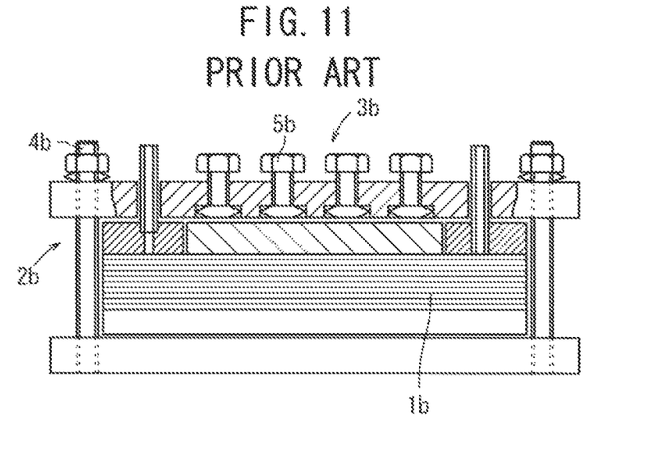
FIG. 11 is a partial cross sectional view showing the fuel cell disclosed in Japanese Laid-Open Patent Publication No. 08-088018.

Further, as shown in FIG. 11, a solid polymer electrolyte fuel cell disclosed in Japanese Laid-Open Patent Publication No. 08-088018 includes a fuel cell stack body $1b$ formed by stacking unit cells through electrically conductive separators, and tightening means for tightening the fuel cell stack body $1b$ in the stacking direction. The tightening means includes first tightening means $2b$ for tightening an area where manifolds are provided, and second tightening means $3b$ for tightening an area where power generation is performed. The first tightening means $2b$ includes bolts $4b$, and the second tightening means $3b$ includes bolts $5b$.

Figure 12:
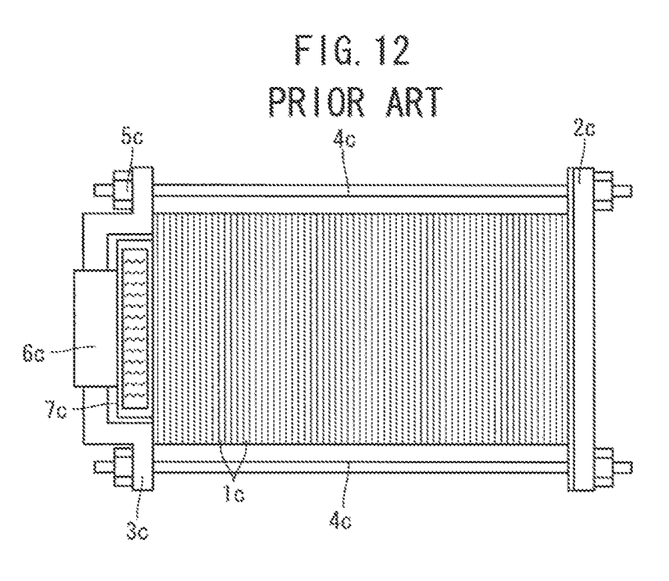
FIG. 12 is a view showing a fuel cell disclosed in Japanese Laid-Open Patent Publication No. 2006-179402.

Further, in a fuel cell disclosed in Japanese Laid-Open Patent Publication No. 2006-179402, as shown in FIG. 12, a stack body formed by stacking a plurality of unit cells $1c$ is sandwiched between a pair of end plates $2c$, $3c$. A load is applied to portions of the unit cells $1c$ where sealing is required by applying a tightening load to components between the end plates $2c$, $3c$ using a plurality of through bolts $4c$ and nuts $5c$.

A load adjuster $6c$ adjusts a pressure force of a spring box $7c$ applied to an end plate $3c$. By the pressure force of the spring box $7c$, a tightening load is applied to the power generation area of the unit cell $1c$.

SUMMARY OF INVENTION

Before separators are used, the separators have distortion that is present after production of the separators to form a stack. Therefore, when separators having such distortion are stacked together, due to accumulation of the distortion, the stack may not have dimensions as designed. Further, since the separators have spring characteristics due to the distortion, and the rigidity of the stack is high, a larger load is required at the time of stacking the separators.

After the fuel cell stack is used in power generation, the separators tend to be deformed to fit with the shape of the fuel cell stack. Therefore, the state of tightening the fuel cell stack changes from the initial state. Further, since the separators and MEAs are expanded or contracted due to the heat during power generation reaction, the stack is also expanded or contracted, and the stacking load changes during operation.

However, Japanese Laid-Open Patent Publication No. 2007-073359 uses a technique of merely applying a certain load to the power generation area of the power generation cell $1a$ by the weight $5a$. Therefore, even if it becomes necessary to apply a new load to the fuel cell stack in correspondence with changes in the load during operation, it is not possible to apply the new load.

Further, in Japanese Laid-Open Patent Publication No. 08-088018, the second tightening means $3b$ applies the tightening load for tightening the area where power generation is performed in the fuel cell stack body $1b$ using the bolts $5b$. Therefore, it is not possible to change the load in correspondence with changes in the load required during operation of the fuel cell stack.

Further, in Japanese Laid-Open Patent Publication No. 2006-179402, the tightening load applied to the area where power generation is performed in the unit cell $1c$ depends on the pressure applied by the spring box $7c$. Therefore, even in the case where the load to the fuel cell stack needs to be changed newly (to increase the tightening load), it is difficult to change the load.

The present invention has been made to solve the problems of this type, and an object of the present invention is to provide a fuel cell module in which it is possible to easily and reliably handle distortion that is present in separators before the separators are used, and changes in the shape of the separators after power generation reaction, and maintain the desired gas sealing performance and durability.

The present invention relates to a fuel cell module including a fuel cell stack and a load applying mechanism. The fuel cell stack is formed by stacking a plurality of fuel cells, and providing a first end plate and a second end plate at both ends of the fuel cells in a stacking direction. Each of the fuel cells is formed by stacking an electrolyte electrode assembly and a separator in the stacking direction. Each of the electrolyte electrode assemblies includes an anode, a cathode, and an electrolyte interposed between the anode and the cathode. The load applying mechanism applies a load to the fuel cell stack in the stacking direction.

The load applying mechanism includes a first tightening load applying unit for applying a first tightening load to a gas sealing portion of the fuel cell stack, a second tightening load applying unit for applying a second tightening load to the electrolyte electrode assembly, and a third tightening load applying unit provided at the first tightening load applying unit for applying a third tightening load to the gas sealing portion in the stacking direction, separately from the first tightening load applying unit. The second tightening load is smaller than the first tightening load.

In the present invention, the third tightening load applying unit is provided at the first tightening load applying unit for applying the first tightening load to the gas sealing portion of the fuel cell stack in the stacking direction. In the structure, the third tightening load applying unit can apply the third tightening load to the gas sealing portion in the stacking direction, separately from the first tightening load applying unit. Therefore, adjustment of the load can be performed easily.

Thus, even if distortion is present in the separators before the separators are used, the desired gas sealing performance can be maintained reliably by applying the first tightening load and the third tightening load.

Further, when the stacking load changes due to the change in the shape of the separators after power generation reaction, the load can be adjusted by the third tightening load applying unit. Therefore, the desired sealing performance and the desired stacking load can be maintained suitably.

DESCRIPTION OF EMBODIMENTS

Figure 1:
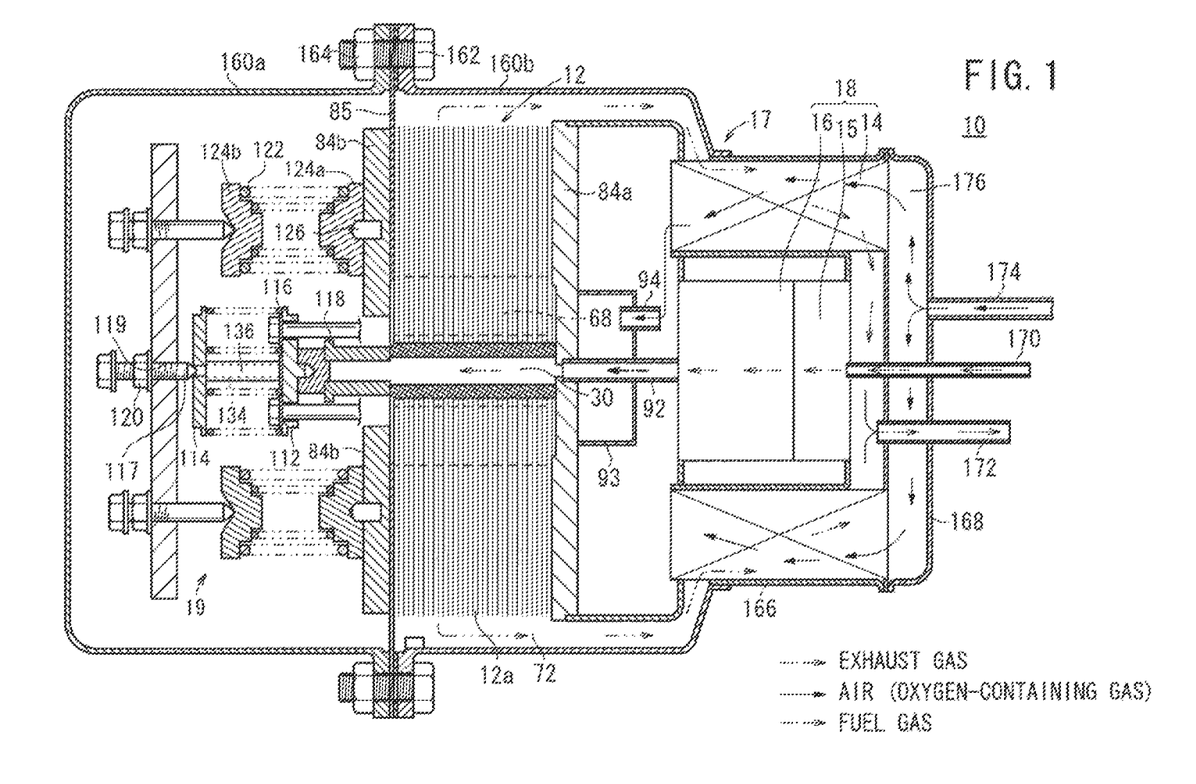
FIG. 1 is a cross sectional view showing a fuel cell module according to an embodiment of the present invention.

As shown in FIG. 1, a fuel cell module 10 according to an embodiment of the present invention is used in various applications, including stationary and mobile applications. For example, the fuel cell module 10 is mounted on a vehicle. The fuel cell module 10 includes a fuel cell stack 12, a heat exchanger 14 for heating the oxygen-containing gas before it is supplied to the fuel cell stack 12, an evaporator 15 for evaporating water to produce a mixed fuel of the raw fuel and the water vapor, a reformer 16 for reforming the mixed fuel to produce a fuel gas (reformed gas), and a casing 17 containing the fuel cell stack 12, the heat exchanger 14, the evaporator 15, and the reformer 16.

The reformer 16 reforms higher hydrocarbons ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming as a preliminary reformer, and the reformer 16 is operated at an operating temperature of several hundred degrees Celsius.

Figure 2:
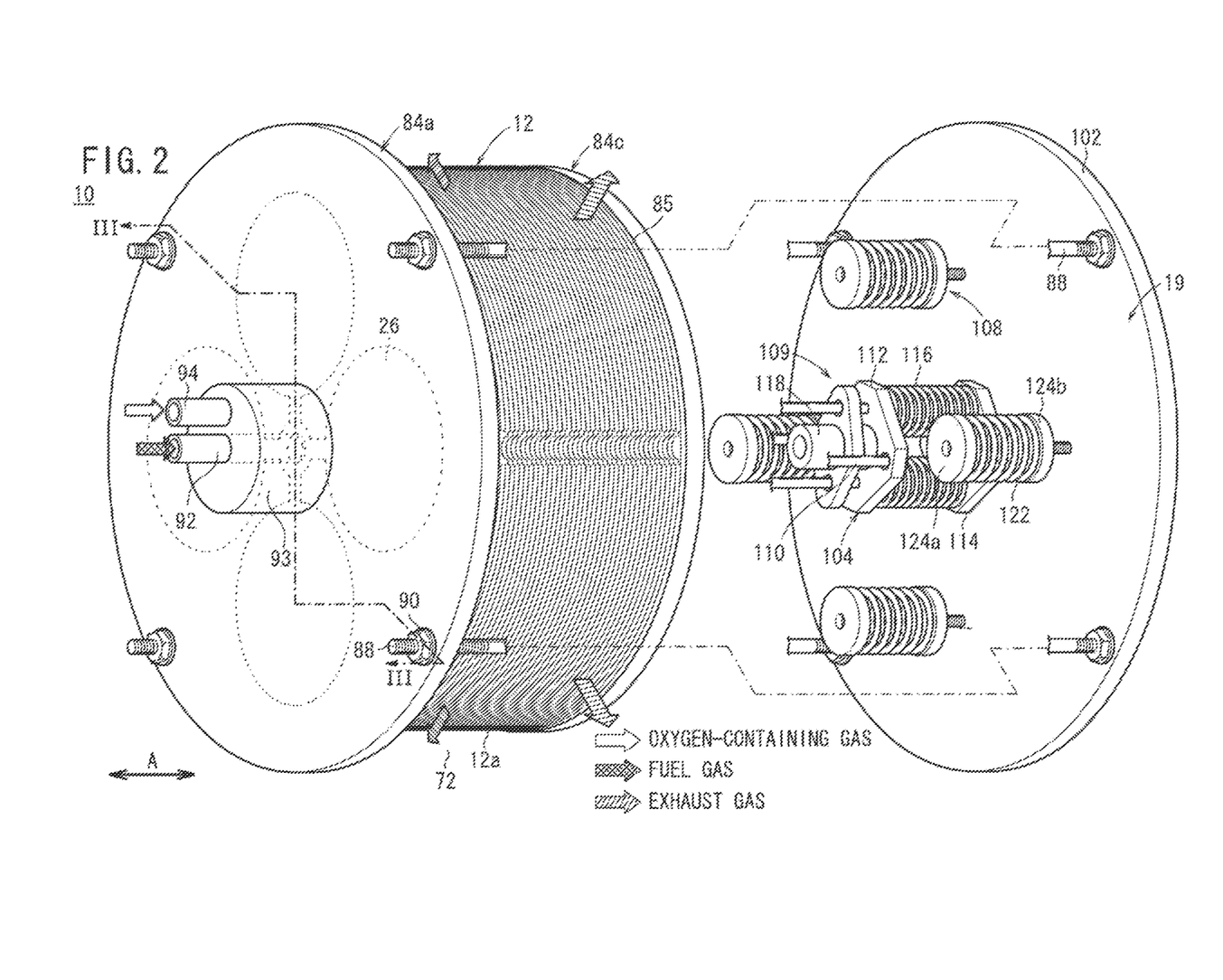
FIG. 2 is a perspective view schematically showing a fuel cell stack of the fuel cell module.
Figure 3:
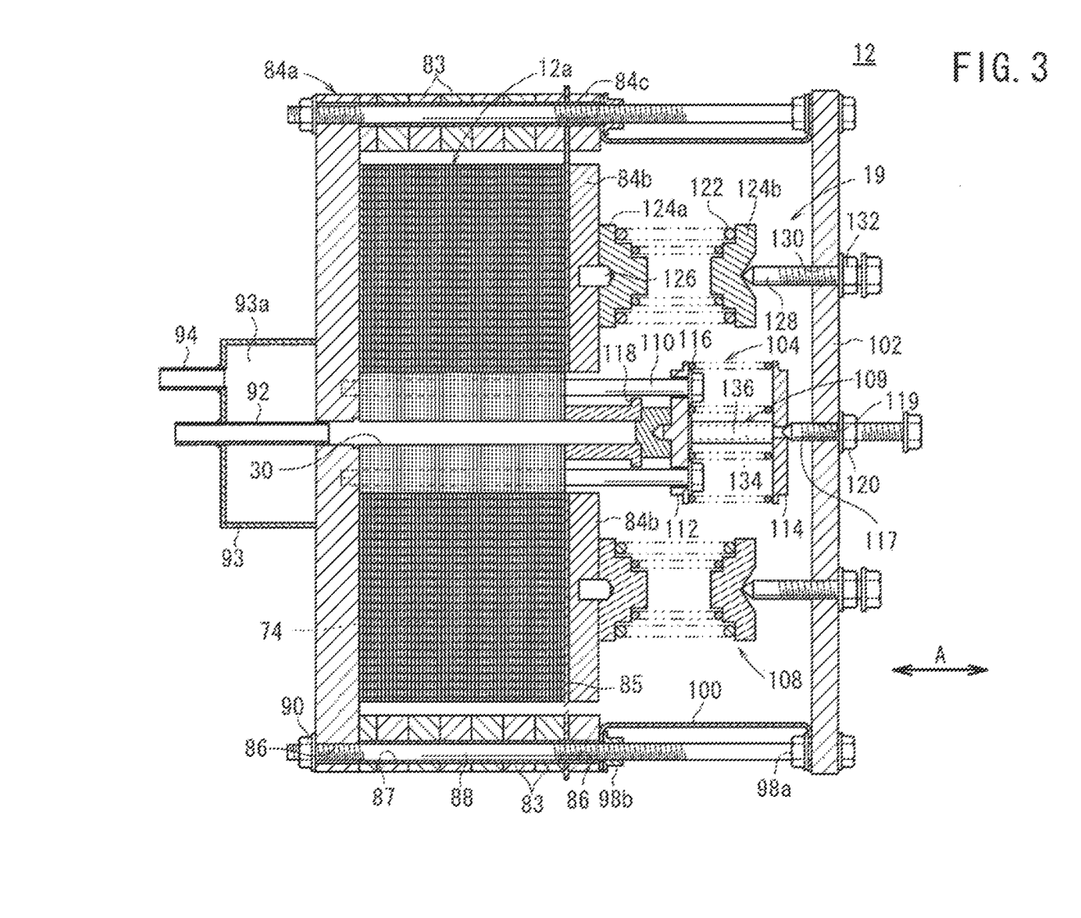
FIG. 3 is a cross sectional view showing the fuel cell stack, taken along a line III-III in FIG. 2.

In the casing 17, a fluid unit 18 including at least the heat exchanger 14, the evaporator 15, and the reformer 16 is disposed on one side of the fuel cell stack 12, and a load applying mechanism 19 for applying a tightening load in the stacking direction indicated by an arrow A is disposed on the other side of the fuel cell stack 12 (see FIGS. 1 to 3).

Figure 4:
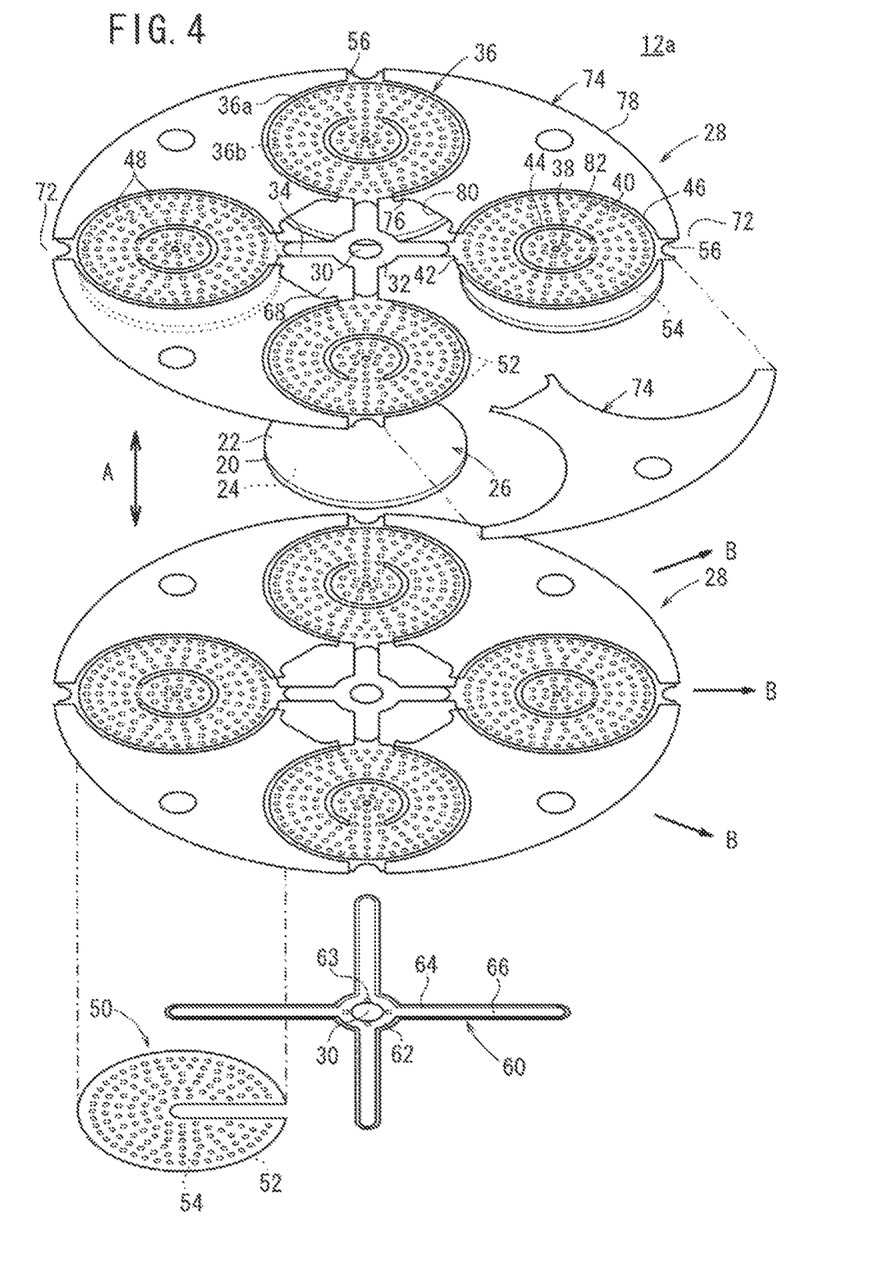
FIG. 4 is an exploded perspective view showing the fuel cell.
Figure 5:
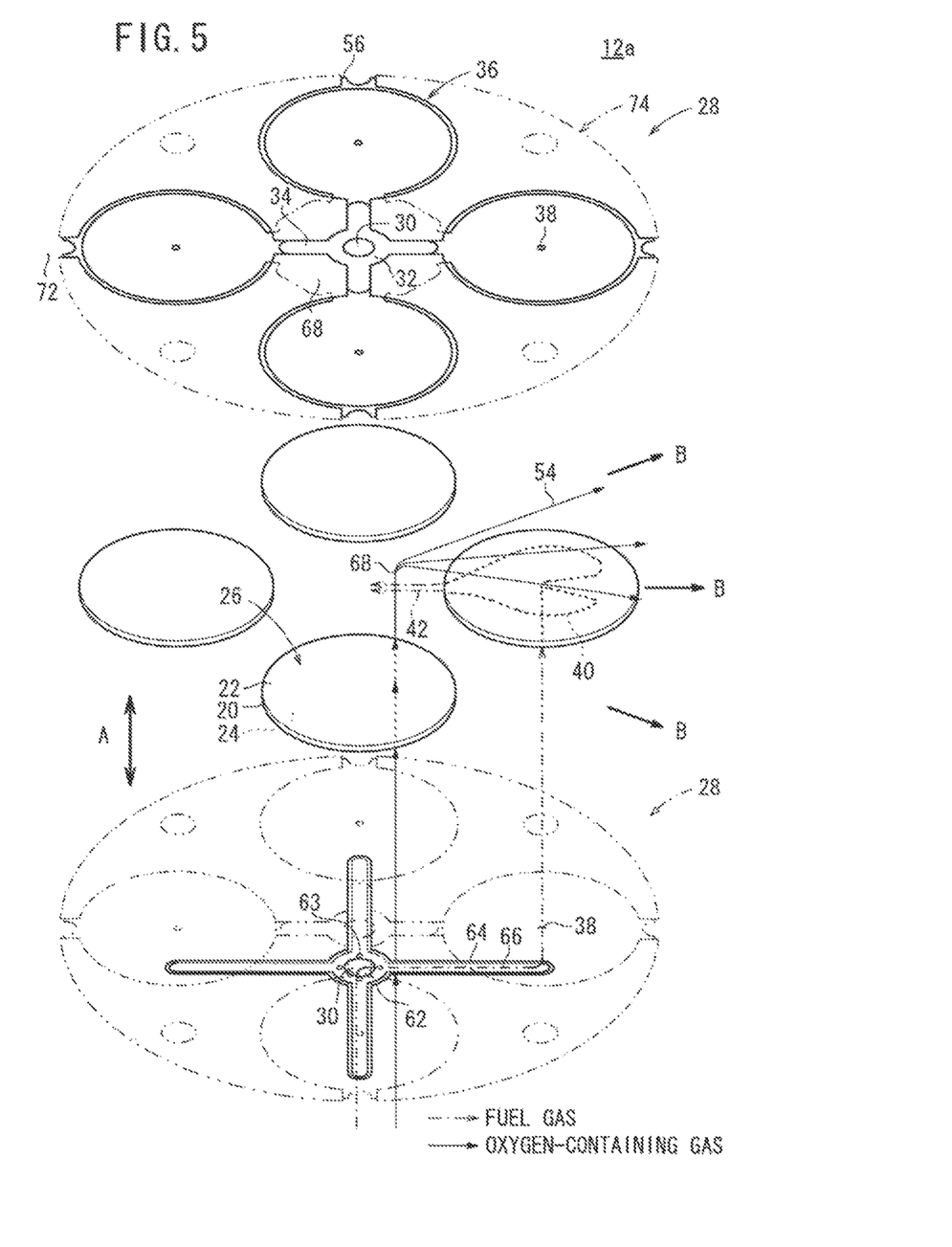
FIG. 5 is a partially exploded perspective view showing gas flows in the fuel cell.

The fuel cell stack 12 includes a plurality of fuel cells 12a. The fuel cell 12a is a solid electrolyte fuel cell. As shown in FIGS. 4 and 5, the fuel cell 12a includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive oxide such as stabilized zirconia. The electrolyte electrode assembly 26 has a circular disk shape. A barrier layer (not shown) is provided at least at the outer circumferential edge of the electrolyte electrode assembly 26 for preventing the entry or discharge of the oxygen-containing gas and the fuel gas.

In the fuel cell 12a, four electrolyte electrode assemblies 26 are sandwiched between a pair of separators 28. The four electrolyte electrode assemblies 26 are provided on a circle concentrically around a fuel gas supply passage (reactant gas supply passage) 30 extending through the center of the separators 28.

As shown in FIG. 4, each of the separators 28 includes, e.g., one metal plate of stainless alloy etc., or a carbon plate. A fuel gas supply section (reactant gas supply section) 32 is formed at the center of the separator 28, and the fuel gas supply passage 30 extends through the fuel gas supply section 32. Four first bridges 34 extend radially outwardly from the fuel gas supply section 32 at equal intervals, e.g., 90°. The fuel gas supply section 32 is integral with sandwiching sections 36 each having a relatively large diameter, through the first bridges 34. The centers of sandwiching sections 36 are equally distanced from the center of the fuel gas supply section 32.

Each of the sandwiching sections 36 has a circular disk shape, having substantially the same dimensions as the electrolyte electrode assembly 26. The sandwiching sections 36 are separated from each other. A fuel gas inlet 38 for supplying the fuel gas is formed at the center of the sandwiching section 36, or at an upstream position deviated from the center of the sandwiching section 36 in the flow direction of the oxygen-containing gas.

Each of the sandwiching sections 36 has a fuel gas channel 40 on a surface 36a which contacts the anode 24, for supplying a fuel gas along an electrode surface of the anode 24. Further, a fuel gas discharge channel 42 for discharging the fuel gas partially consumed in the fuel gas channel 40 and a circular arc wall 44 forming a detour path to prevent the fuel gas from flowing straight from the fuel gas inlet 38 to the fuel gas discharge channel 42 are provided on the surface 36a.

The circular arc wall 44 has a substantially horseshoe shape. The fuel gas inlet 38 is provided on a distal end side, inside the circular arc wall 44, and the fuel gas discharge channel 42 is provided on the proximal end side, near the first bridge 34. On the surface 36a, a circumferential protrusion 46 and a plurality of projections 48 are provided. The circumferential protrusion 46 protrudes toward the fuel gas channel 40, and contacts the outer edge of the anode 24, and the projections 48 contact the anode 24.

The protrusion 46 has a substantially ring shape with partial cutaway at a position corresponding to the fuel gas discharge channel 42. The projections 48 are made of solid portions formed by, e.g., etching, or hollow portions formed by press forming.

Figure 6:
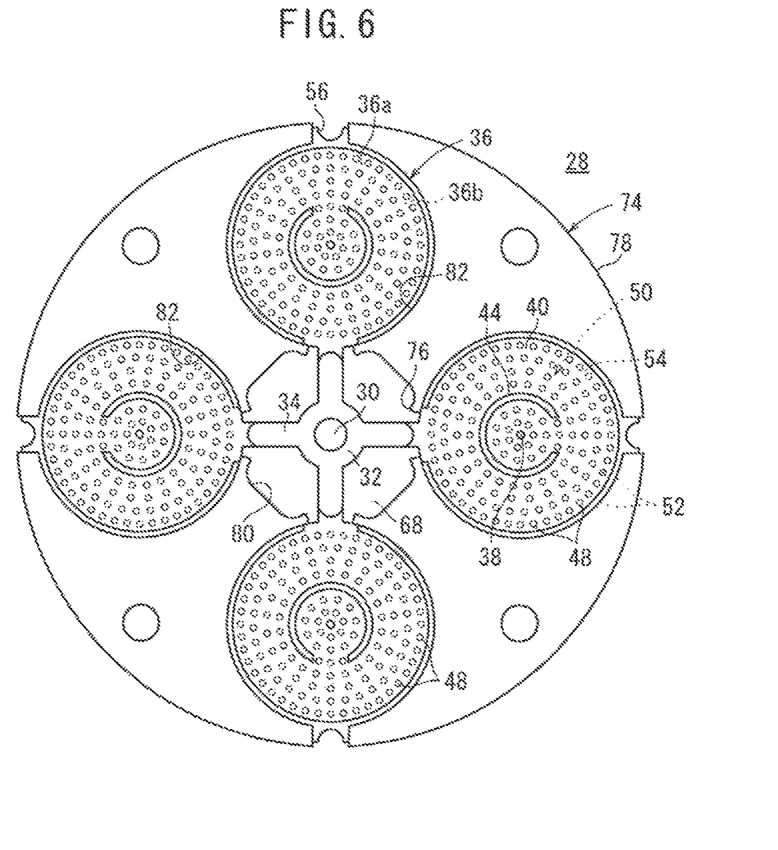
FIG. 6 is a plan view showing a separator of the fuel cell.
Figure 7:
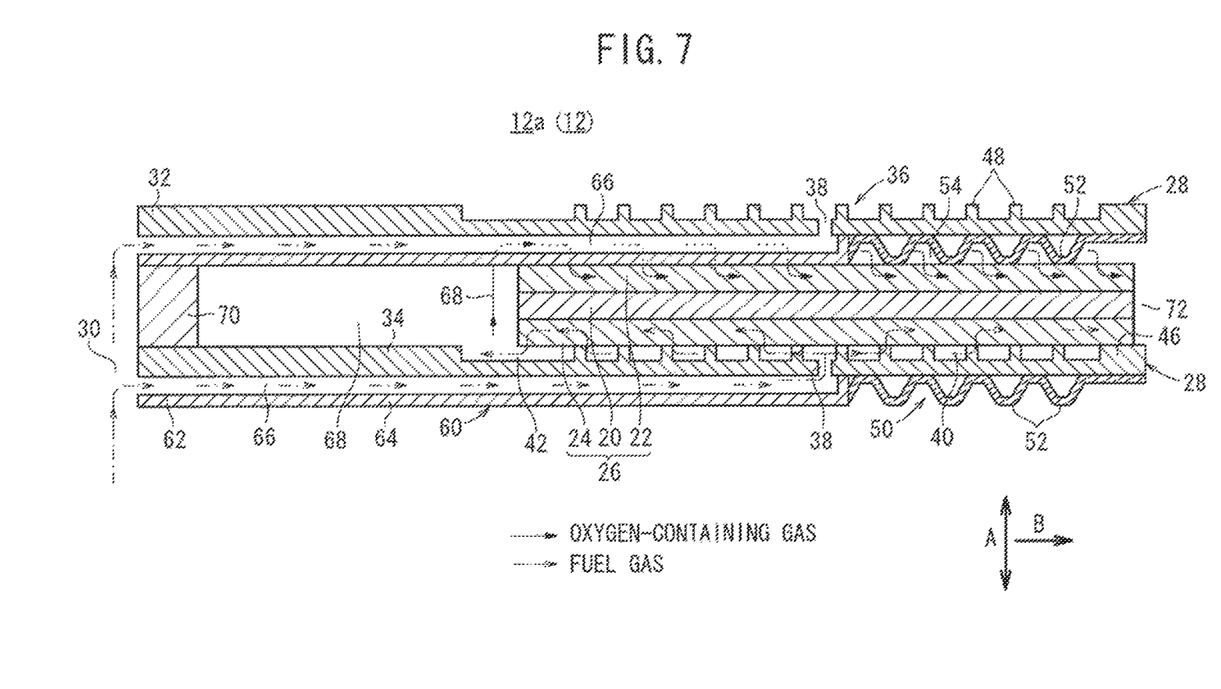
FIG. 7 is a cross sectional view schematically showing operation of the fuel cell.

As shown in FIGS. 6 and 7, each of the sandwiching sections 36 has a substantially planar surface 36b which contacts the cathode 22. A plate 50 having a circular disk shape is fixed to the surface 36b, e.g., by brazing, diffusion bonding, laser welding, or the like. A plurality of projections 52 are provided on the plate 50, e.g., by press forming. By the projections 52, an oxygen-containing gas channel 54 for supplying an oxygen-containing gas along an electrode surface of the cathode 22 is formed on the side of the surface 36b of the sandwiching section 36. The projections 52 function as a current collector.

Extensions 56 extend from the outer circumferential positions of the respective sandwiching sections 36. The extensions 56 are used for collecting and measuring generated electrical energy from the fuel cells 12a, positioning the electrolyte electrode assemblies 26 to the separators 28, and detecting the number of fuel cells (see FIGS. 4 to 6).

As shown in FIG. 4, a channel member 60 is fixed to a surface of the separator 28 facing the cathode 22, e.g., by brazing, diffusion bonding, or laser welding. The channel member 60 has a planar shape. The fuel gas supply passage 30 extends through a fuel gas supply section 62 at the center thereof in the channel member 60. A predetermined number of reinforcement bosses 63 are formed in the fuel gas supply section 62.

Four second bridges 64 extend radially from the fuel gas supply section 62. Each of the second bridges 64 is fixed to the separator 28 from the first bridge 34 to the surface 36b of the sandwiching section 36 to cover the fuel gas inlet 38 (see FIG. 7).

From the fuel gas supply section 62 to the second bridge 64, a fuel gas supply channel 66 connecting the fuel gas supply passage 30 to the fuel gas inlet 38 is formed. For example, the fuel gas supply channel (reactant gas supply channel) 66 is formed by, e.g., etching.

As shown in FIG. 7, the oxygen-containing gas channel 54 is connected to the oxygen-containing gas supply passage (reactant gas supply section) 68 for supplying the oxygen-containing gas from a space between an inner circumferential edge of the electrolyte electrode assembly 26 and an inner circumferential edge of the sandwiching section 36 in a direction indicated by an arrow B. The oxygen-containing gas supply passage 68 extends between the inside of the respective sandwiching sections 36 and the respective first bridges 34 in the stacking direction indicated by the arrow A.

An insulating seal 70 for sealing the fuel gas supply passage 30 is provided between the separators 28. For example, crustal component material such as mica material and ceramic material, glass material, and composite material of clay and plastic may be used for the insulating seal 70. The insulating seal 70 seals the fuel gas supply passage 30 from the electrolyte electrode assemblies 26. For the fuel cells 12a, an exhaust gas channel 72 is provided outside (around) the sandwiching sections 36.

A flow rectifier member 74 is provided in each space between the adjacent sandwiching sections 36 for rectifying the flow of the oxygen-containing gas supplied from the oxygen-containing gas supply passage 68, and flowing through the oxygen-containing gas channel 54 along the surface of each electrolyte electrode assembly 26 and rectifying the flow of the fuel gas flowing in the fuel gas channel 40 along the surface of each electrolyte electrode assembly 26. The flow rectifier member 74 is a plate having a substantially fan shape. A predetermined number of the flow rectifier members 74 are stacked in the direction indicated by the arrow A. The number of the flow rectifier members 74 in a plan view is four, corresponding to positions between the sandwiching sections 36.

The flow rectifier member 74 is formed by joining an electrically insulating member of, e.g., mica material, with silicone resin. The flow rectifier member 74 is provided along part of the outer edge of the sandwiching section 36 and part of the circumscribed circle of the separator 28. One end of the flow rectifier member 74 along the part of the sandwiching section 36 is provided near the joint positions between the sandwiching sections 36 and the first bridges 34, and an outer circumferential portion 78 as the other end of the flow rectifier member 74 form part of the circumscribed circle of the separator 28.

The one end of the flow rectifier member 74 includes a cutout 80 which is cut in a direction away from the oxygen-containing gas supply passage 68 and the fuel gas supply passage 30. Circular arc portions 82 respectively corresponding to the outer shapes of the sandwiching sections 36 are formed on both sides of the flow rectifier member 74.

As shown in FIGS. 2 and 3, in the fuel cell stack 12, an end plate (second end plate) 84a having a substantially circular disk shape is provided at one end of the fuel cells 12a in the stacking direction. Further, the fuel cell stack 12 includes a plurality of end plates (first end plates) 84b and a fixing ring 84c at the other end in the stacking direction, through a partition wall 85. Each of the end plates 84b has a small diameter, and a substantially circular shape, and the fixing ring 84c has a large diameter, and a substantially ring shape. A plurality of ring members 83 are interposed between the end plate 84a and the end plates 84b.

The partition wall 85 prevents diffusion of the exhaust gas to the outside of the fuel cell 12a. The number of end plates 84b is four, corresponding to the positions of stacking the electrolyte electrode assemblies 26.

The end plate 84a and the fixing ring 84c include a plurality of holes 86. Bolt insertion collar members 87 are integrally inserted into the ring members 83 in the stacking direction. Bolts 88 are inserted into the holes 86 and the bolt insertion collar members 87, and screwed into nuts 90. By the Bolts 88 and the nuts 90, the end plate 84a and the fixing ring 84c are fixedly tightened together.

One fuel gas supply pipe 92, a casing 93, and one oxygen-containing gas supply pipe 94 are provided at the end plate 84a. The fuel gas supply pipe 92 is connected to the fuel gas supply passage 30. The casing 93 has a cavity 93a connected to the respective oxygen-containing gas supply passages 68. The oxygen-containing gas supply pipe 94 is connected to the casing 93, and to the cavity 93a.

A support plate member 102 is fixed to the end plate 84a through a plurality of bolts 88, nuts 98a, 98b, and plate collar members 100. A first tightening load applying unit 104 for applying a first tightening load to the fuel gas supply sections 32, 62 (gas sealing portions where gas sealing is required), second tightening load applying units 108 for applying a second tightening load to each of the electrolyte electrode assemblies 26, and a third tightening load applying unit 109 are provided between the support plate member 102 and the end plate 84a. The second tightening load is smaller than the first tightening load. Further, the third tightening load applying unit 109 is provided at the first tightening load applying unit 104, for applying a third tightening load to the fuel gas supply sections 32, 62 separately from the first tightening load applying unit 104. The first tightening load applying unit 104, the second tightening load applying units 108, and the third tightening load applying unit 109 form the load applying mechanism 19.

The load applying mechanism 19 is provided on the end plate 84b side, and the first tightening load applying unit 104 and the third tightening load applying unit 109 support the load in the stacking direction through the end plate 84a.

Figure 8:
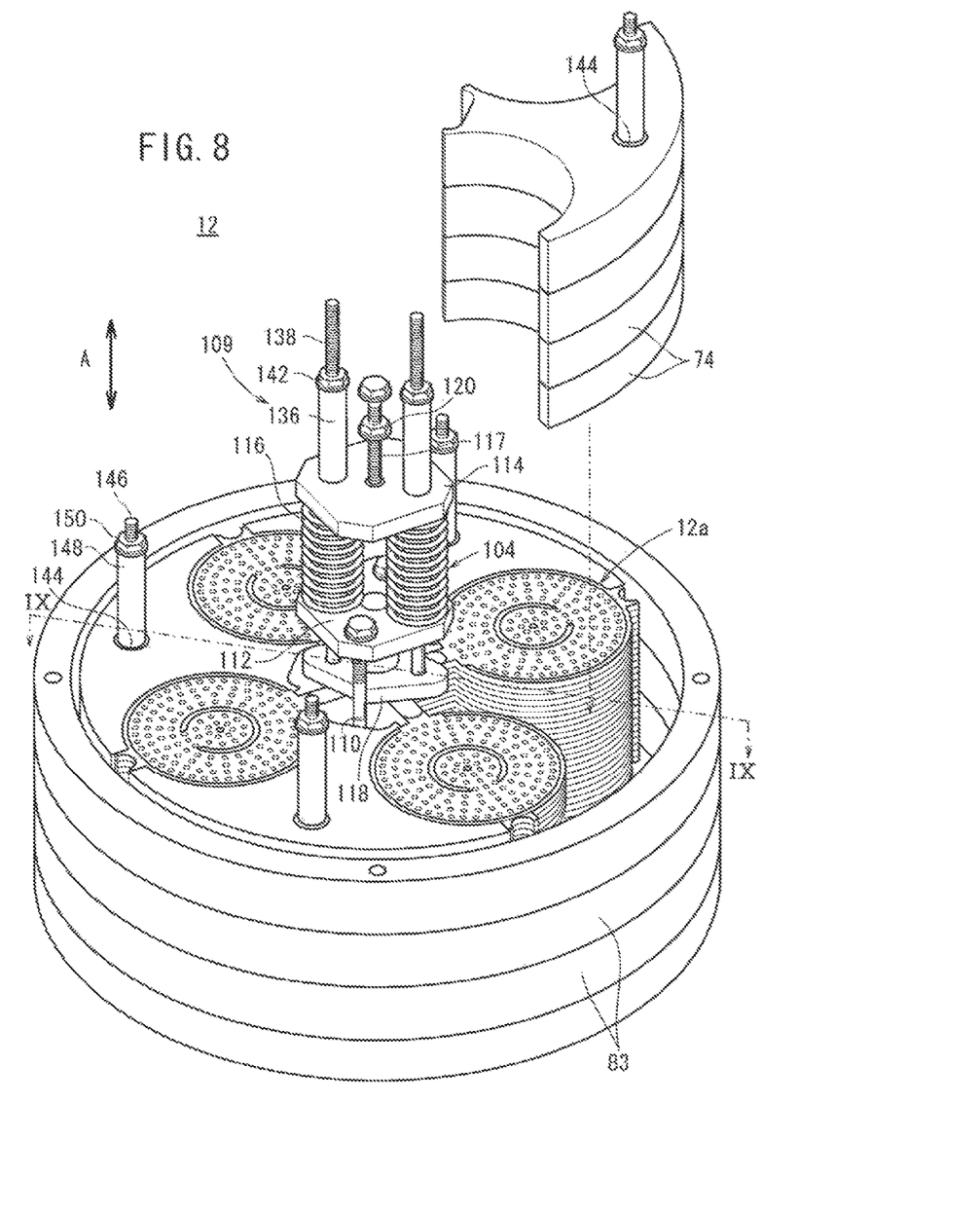
FIG. 8 is a partially exploded perspective view showing the fuel cell stack.

As shown in FIGS. 2, 3, and 8, the first tightening load applying unit 104 includes two bolts (first bolts) 110 screwed into the end plate 84a extending through the stacked fuel cells 12a toward the end plate 84b, and a first plate member 112 engaged with the bolts 110, and a first spring member 116 interposed between the first plate member 112 and a support plate 114 to apply the load in the stacking direction to the fuel gas supply sections 32, 62.

A presser member 118 is provided at the center of the fuel cells 12a (centers of the fuel gas supply sections 32, 62) for preventing leakage of the fuel gas from the fuel gas supply passage 30. The presser member 118 is provided near the center of the four end plates 84b for pressing the fuel cells 12a. A first plate member 112 is provided for the presser member 118, and a tip end of a first presser bolt 117 contacts the support plate 114. The first presser bolt 117 is screwed into a first screw hole 119 formed in the support plate member 102. The position of the first presser bolt 117 is adjustable through a first nut 120.

Each of the second tightening load applying units 108 includes a bolt (second bolt) 88 screwed into the end plate 84a, the support plate member 102 (second plate member) engaged with the bolt 88, and a second spring member 122 interposed between the support plate member 102 and the fuel cell 12a for applying the load to the electrolyte electrode assemblies 26 in the stacking direction.

A receiver member 124a is provided at the end plate 84b, corresponding to each of the electrolyte electrode assemblies 26. The receiver member 124a is positioned on the end plate 84b through a pin 126. One end of the second spring member 122 contacts the receiver member 124a, and the other end of the second spring member 122 contacts a receiver member 124b. A tip end of a second presser bolt 128 contacts the receiver member 124b. The second presser bolt 128 is screwed into a second screw hole 130 formed in the support plate member 102. The position of the second presser bolt 128 is adjustable through a second nut 132.

Figure 9:
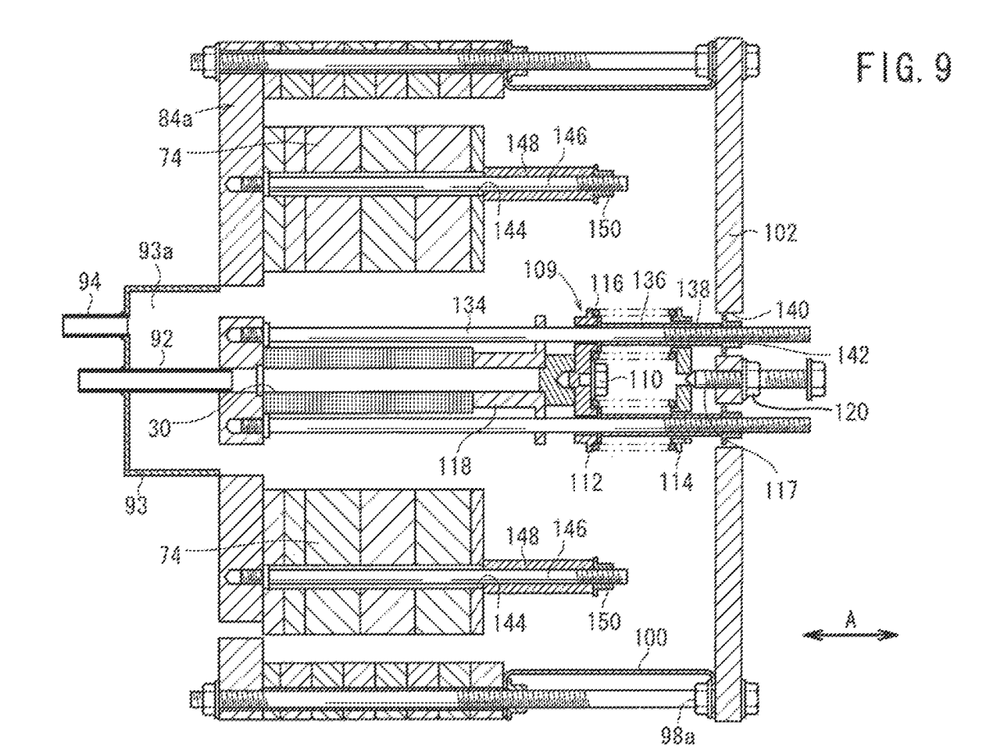
FIG. 9 is a cross sectional view showing the fuel cell stack, taken along a line IX-IX in FIG. 8.

As shown in FIGS. 8 and 9, the third tightening load applying unit 109 includes a pair of bolts (third bolt) 134 screwed into the end plate 84a, a pair of presser members 136 interposed between the first plate member 112 and the support plate member 102 for applying a load to the first plate member 112 in the stacking direction.

A threaded portion 138 is formed in the outer circumference of the bolt 134, and the threaded portion 138 has a predetermined length from one end of the bolt 134. The threaded portion 138 is inserted into a hole 140 formed in the support plate member 102. The presser member 136 externally fitted to the threaded portion 138 has a cylindrical shape, and one end of the presser member 136 contacts the first plate member 112, and the other end of the presser member 136 contacts a nut member 142. The threaded portion 138 is screwed into the nut member 142.

The first spring member 116 is interposed between the first plate member 112 and the support plate 114 around the presser member 136. The bolts 134 extend through the first plate member 112 and the support plate 114. The threaded portions 138 of the bolts 134 are screwed into the nut members 142, and the nut members 142 are screwed (spirally rotated) in a predetermined direction for allowing the presser members 136 to press the first plate member 112. Thus, by the presser member 118 which contacts the first plate member 112, the load in the stacking direction is applied to the center of the fuel cells 12a.

Each of the four flow rectifier members 74 has a through hole 144 extending in the stacking direction. A bolt 146 is inserted into each hole 144, and the bolt 146 is screwed into the end plate 84a. A cylindrical presser member 148 is externally fitted to an end of the bolt 146 extending outwardly from the flow rectifier member 74. One end of the presser member 148 contacts an end surface of the flow rectifier member 74 provided at the outermost position. The bolt 146 is screwed into a nut member 150. The other end of the presser member 148 contacts the nut member 150, and the presser member 148 is supported by the nut member 150.

As shown in FIG. 1, the casing 17 includes a first case unit 160a containing the load applying mechanism 19, and a second case unit 160b containing the fuel cell stack 12. The joint portion between the first case unit 160a and the second case unit 160b is tightened by screws 162 and nuts 164 through the partition wall 85. The partition wall 85 functions as a gas barrier for preventing entry of the hot exhaust gas or the hot air from the fluid unit 18 into the load applying mechanism 19. An end of a ring shaped wall plate 166 is joined to the second case unit 160b, and a head plate 168 is fixed to the other end of the wall plate 166.

A fuel gas supply pipe 170 is connected to the evaporator 15. The fuel gas supply pipe 170 is connected to a raw fuel supply unit (not shown) for supplying a raw fuel (methane, ethane, propane, or the like). The outlet of the evaporator 15 is connected to the inlet of the reformer 16. An exhaust gas pipe 172 is provided adjacent to the fuel gas supply pipe 170.

An oxygen-containing gas supply pipe 174 is connected to the head plate 168, and the oxygen-containing gas supply pipe 174 extends through a channel 176 in the casing 17, and connects the heat exchanger 14 to the oxygen-containing gas supply passage 68.

Operation of the fuel cell module 10 will be described below.

As shown in FIG. 1, the air ejected from an air pump (not shown) as an oxygen-containing gas is supplied from the oxygen-containing gas supply pipe 174 to the channel 176 in the casing 17. The air is heated by the heat exchanger 14, and then, the air is supplied through the oxygen-containing gas supply pipe 94 to each of the oxygen-containing gas supply passages 68 through the cavity 93a.

A raw fuel (methane, ethane, propane or the like) is supplied from the fuel gas supply pipe 170 to the reformer 16, and water is supplied from the fuel gas supply pipe 170 to the reformer 16. The raw fuel flows through the reformer 16, and the raw fuel is reformed to produce a fuel gas (hydrogen-containing gas). The fuel gas is supplied from the fuel gas supply pipe 92 connected to the end plate 84a to the fuel gas supply passage 30.

As shown in FIG. 7, the fuel gas flows along the fuel gas supply passage 30 of the fuel cell stack 12 in the stacking direction indicated by the arrow A. The fuel gas moves through the fuel gas supply channel 66 formed in each of the fuel cells 12a along the surface of the separator 28.

The fuel gas flows from the fuel gas supply channel 66 into the fuel gas channel 40 through the fuel gas inlet 38 formed in the sandwiching section 36. The fuel gas inlet 38 is provided at substantially the central position of the anode 24 of each electrolyte electrode assembly 26. Thus, the fuel gas is supplied from the fuel gas inlet 38 to substantially the central region of the anode 24, and flows along the fuel gas channel 40 to the outer circumferential region of the anode 24.

Under the rectifying operation of the flow rectifier member 74, the oxygen-containing gas is supplied to the oxygen-containing gas supply passage 68, and flows into the space between the inner circumferential edge of the electrolyte electrode assembly 26 and the inner circumferential edge of the sandwiching section 36, and flows in the direction indicated by the arrow B toward the oxygen-containing gas channel 54. In the oxygen-containing gas channel 54, the oxygen-containing gas flows from the inner circumferential edge (center of the separator 28) to the outer circumferential edge (outer circumferential edge of the separator 28) of the electrolyte electrode assembly 26.

Thus, in each of the electrolyte electrode assemblies 26, the fuel gas flows from the center to the outer circumferential side on the electrode surface of the anode 24, and the oxygen-containing gas flows in one direction indicated by the arrow B on the electrode surface of the cathode 22. At this time, oxide ions move through the electrolyte 20 toward the anode 24 for generating electricity by chemical reactions.

The exhaust gas chiefly containing the air after partial consumption in the power generation reaction is discharged to the outer circumferential region of each of the electrolyte electrode assemblies 26, and flows through the exhaust gas channels 72 as the off gas, and the off gas is discharged from the fuel cell stack 12 (see FIG. 1).

In the present embodiment, as shown in FIGS. 3, 8, 9, in addition to the first tightening load applying unit 104 for applying the first tightening load to the fuel gas supply sections 32, 62 (gas sealing portions) of the fuel cell stack 12, the third tightening load applying unit 109 is provided. Thus, the third tightening load applying unit 109 can apply the third tightening load to the fuel gas supply sections 32, 62 in the stacking direction, separately from the first tightening load applying unit 104. Therefore, adjustment of the load can be performed easily.

Thus, even if distortion is present in the separators 28 before the separators 28 are used, by applying the first tightening load and the third tightening load, the desired sealing performance in the fuel gas supply sections 32, 62 is maintained reliably.

Further, when the stacking load changes due to the change in the shape of the separators 28 after power generation reaction, the load can be adjusted by the third tightening load applying unit 109. Therefore, the desired sealing performance and the desired stacking load in the fuel gas supply sections 32, 62 can be maintained suitably.

Further, the load applying mechanism 19 is provided adjacent to the end plate 84b of the fuel cell stack 12, and the first tightening load applying unit 104 and the third tightening load applying unit 109 maintain the load in the stacking direction through the end plate 84a. Therefore, by using the first tightening load applying unit 104 and the third tightening load applying unit 109, it is possible to reliably apply the load in the stacking direction to the fuel gas supply sections 32, 62, maintain the sealing performance at all times, and maintain and the load in the stacking direction.

Further, as shown in FIGS. 2 and 3, the first tightening load applying unit 104 includes the bolts 110 screwed into the end plate 84a and extending through the fuel cells 12a of the fuel cell stack 12 toward the end plate 84b, the first plate member 112 engaged with the bolts 110, and the first spring member 116 interposed between the first plate member 112 and the support plate 114 to apply the load in the stacking direction to the fuel gas supply sections 32, 62.

The second tightening load applying unit 108 includes the bolt 88 screwed into the end plate 84a, the support plate member 102 engaged with the bolt 88, and the second spring member 122 interposed between the support plate member 102 and the end plate 84b for applying the load in the stacking direction to the electrolyte electrode assembly 26.

In the structure, the first tightening load applying unit 104 and the second tightening load applying unit 108 can apply the spring load. Even if the load related to the fuel cell stack 12 changes depending on the operating condition of the fuel cell stack 12, it becomes possible to track such changes in the load, and handle the changes. Thus, damages of the electrolyte electrode assemblies 26 can be suppressed suitably.

Further, as shown in FIGS. 8 and 9, the third tightening load applying unit 109 includes the bolts 134 screwed into the end plate 84a, and the presser members 136 externally fitted to the bolts 134, and interposed between the first plate member 112 and the support plate 114 for applying a load to the first plate member 112 in the stacking direction. Therefore, by adding a slight improvement to the existing load applying mechanism 19, the third tightening load applying unit 109 can be provided. Thus, production cost can be reduced effectively.

Further, the presser member 136 has the cylindrical shape, and one end of the presser member 136 contacts the first plate member 112, and the other end of the presser member 136 contacts the nut member 142. The threaded portion 138 of the bolt 134 is screwed into the nut member 142. When the nut member 142 is screwed in a predetermined direction, the presser member 136 can apply the load in the stacking direction to the first plate member 112. Therefore, with simple and economical structure, the third tightening load applying unit 109 can be provided.

In the fuel cell stack 12 including the separators 28 which have not been used yet, assuming that the load is firstly applied to the fuel gas supply sections 32, 62 by the first tightening load applying unit 104 before operation, and then, the second tightening load is applied to the electrolyte electrode assemblies 26 between the sandwiching sections 36 by the second tightening load applying unit 108, the desired load may not be applied to the fuel gas supply sections 32, 62 due to distortion or the like in the separators 28.

The nut member 142 of the third tightening load applying unit 109 is screwed for allowing the presser member 136 to apply the third tightening load to the fuel gas supply sections 32, 62 separately. Thus, the gas sealing performance in the fuel gas supply sections 32, 62 can be maintained suitably.

After operation is started, by power generation, the shape of the separators 28 is deformed to fit with the shapes of the other components. Thus, the load applied to the fuel gas supply sections 32, 62 is changed (reduced). At this time, by operating the third tightening load applying unit 109, the desired tightening load can be applied to the fuel gas supply sections 32, 62, and improvement in the sealing performance is achieved easily.

Even if the load required for the fuel cell stack 12 changes during operation, the desired load can be applied at all times by the spring load of the first tightening load applying unit 104 and the spring load of the second tightening load applying unit 108.

Further, as shown in FIG. 1, in the fuel cell module 10, the load applying mechanism 19 is provided adjacent to the end plate 84b of the fuel cell stack 12, and the fluid unit 18 including the heat exchanger 14, the evaporator 15, and the reformer 16 is provided adjacent to the end plate 84a of the fuel cell stack 12. In the structure, the fluid unit 18 and the load applying mechanism 19 are provided separately with respect to the fuel cell stack 12, the load applying mechanism 19 can be separated from the high temperature atmosphere, and improvement in the durability is achieved.

Further, the separator 28 includes the sandwiching section 36, the first and second bridges 34, 64 connected to the sandwiching section 36, and the fuel gas supply sections 32, 62 connected to the first and second bridges 34, 64. The fuel gas supply passage 30 extends through the fuel gas supply sections 32, 62 in the stacking direction. In the structure, the gas sealing portions are formed in the fuel gas supply sections 32, 62. Thus, in the separators 28, sealing can be performed reliably to prevent leakage of the fuel gas flowing through the fuel gas supply passage 30 formed in the fuel gas supply sections 32, 62.

The invention claimed is:

1. A fuel cell module comprising:
a fuel cell stack formed by stacking a plurality of fuel cells, and providing a first end plate and a second end plate at both ends of the fuel cells in a stacking direction, the fuel cells each formed by stacking an electrolyte electrode assembly and a separator in the stacking direction, the electrolyte electrode assembly including an anode, a cathode, and an electrolyte interposed between the anode and the cathode; and
a load applying mechanism for applying a load to the fuel cell stack in the stacking direction,
wherein the load applying mechanism includes:
a first tightening load applying unit for applying a first tightening load to a gas sealing portion of the fuel cell stack;
a second tightening load applying unit for applying a second tightening load to the electrolyte electrode assembly, the second tightening load being smaller than the first tightening load; and
a third tightening load applying unit provided at the first tightening load applying unit for applying a third tightening load to the gas sealing portion in the stacking direction, separately from the first tightening load applying unit, and
wherein the first tightening load applying unit includes:
a first bolt screwed into the second end plate, and extending through the fuel cell stack toward the first end plate;
a first plate member engaged with the first bolt; and
a first spring member interposed between the first plate member and a support plate for applying a load in the stacking direction to the gas sealing portion, and
the second tightening load applying unit includes:
a second bolt screwed into the second end plate;
a second plate member engaged with the second bolt; and
a second spring member interposed between the second plate member and the fuel cell stack for applying a load to the electrolyte electrode assembly in the stacking direction.

2. The fuel cell module according to claim 1, wherein the load applying mechanism is provided adjacent to the first end plate of the fuel cell stack; and
the first tightening load applying unit and the third tightening load applying unit support the load in the stacking direction through the second end plate.

3. The fuel cell module according to claim 1, wherein the third tightening load applying unit includes a third bolt screwed into the second end plate; and
a presser member externally fitted to the third bolt, and interposed between the first plate member and the second plate member for applying a load to the first plate member in the stacking direction.

4. The fuel cell module according to claim 3, wherein the presser member has a cylindrical shape;
one end of the presser member contacts the first plate member and another end of the presser member contacts a nut member;
the third bolt is screwed into the nut member; and
the nut member is screwed for allowing the presser member to apply a load to the first plate member in the stacking direction.

5. The fuel cell module according to claim 1, further comprising:
a fluid unit including a heat exchanger for heating an oxygen-containing gas before the oxygen-containing gas is supplied to the fuel cell stack and a reformer for reforming fuel to produce a fuel gas; and
a casing containing the fluid unit, the fuel cell stack, and the load applying mechanism,
wherein the load applying mechanism is provided adjacent to the first end plate of the fuel cell stack; and
the fluid unit is provided adjacent to the second end plate of the fuel cell stack.

6. The fuel cell module according to claim 1, wherein the separator includes:
a sandwiching section for sandwiching the electrolyte electrode assembly, a fuel gas channel for supplying a fuel gas along an electrode surface of the anode and an oxygen-containing gas channel for supplying an oxygen-containing gas along an electrode surface of the cathode being formed separately in the sandwiching section;
a bridge connected to the sandwiching section, a reactant gas supply channel for supplying the fuel gas to the fuel gas channel or supplying the oxygen-containing gas to the oxygen-containing gas channel being formed in the bridge; and
a reactant gas supply section connected to the bridge, a reactant gas supply passage for supplying the fuel gas or the oxygen-containing gas to the reactant gas supply channel extending through the reactant gas supply section in the stacking direction, and
wherein the gas sealing portion is formed in the reactant gas supply section.

* * * * *